Figure 1:
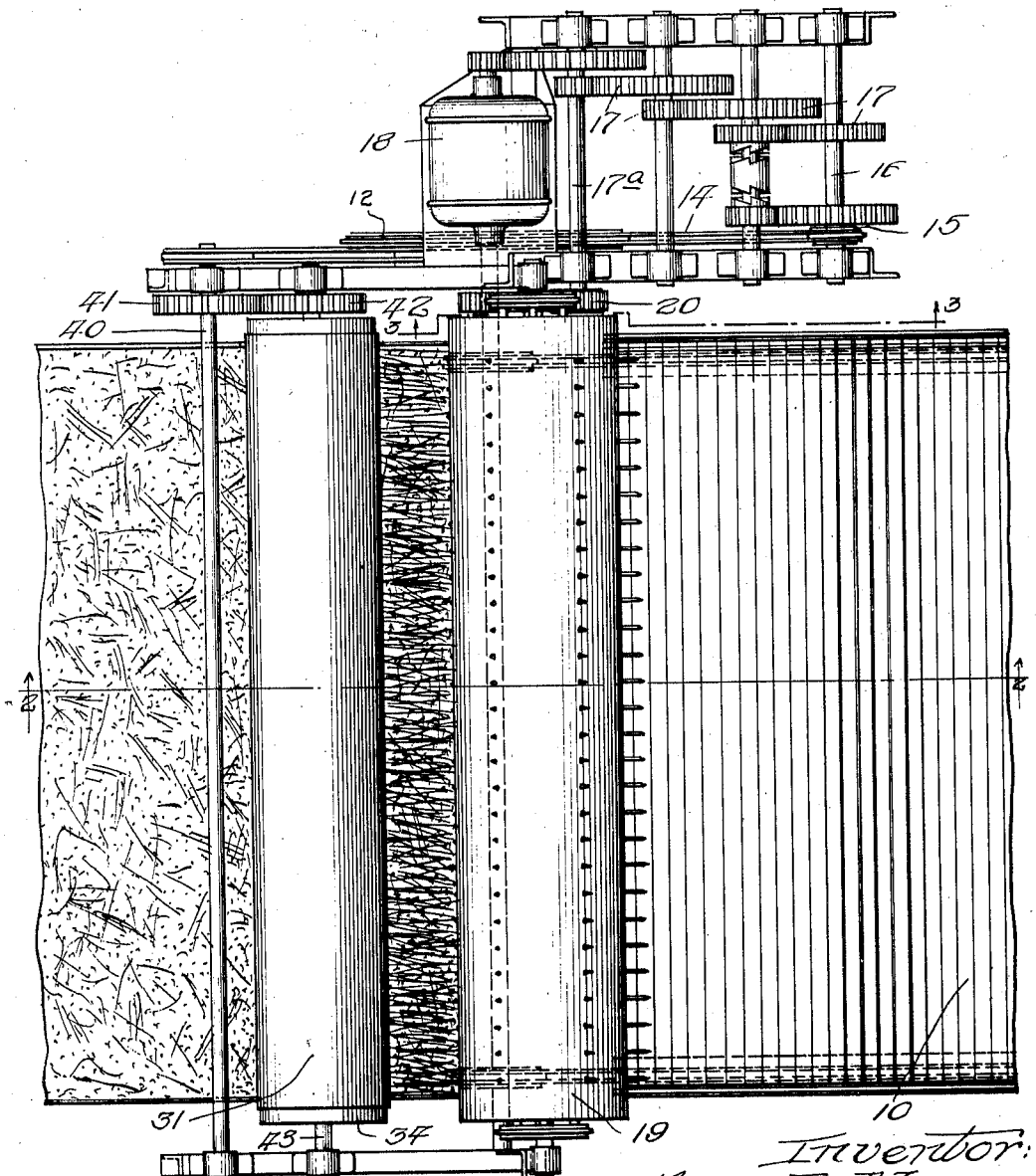

April 24, 1928.  A. J. MASON  1,667,428
ART OF AGRICULTURE
Filed Aug. 18, 1926    4 Sheets-Sheet 1

Inventor:
Arthur J. Mason,

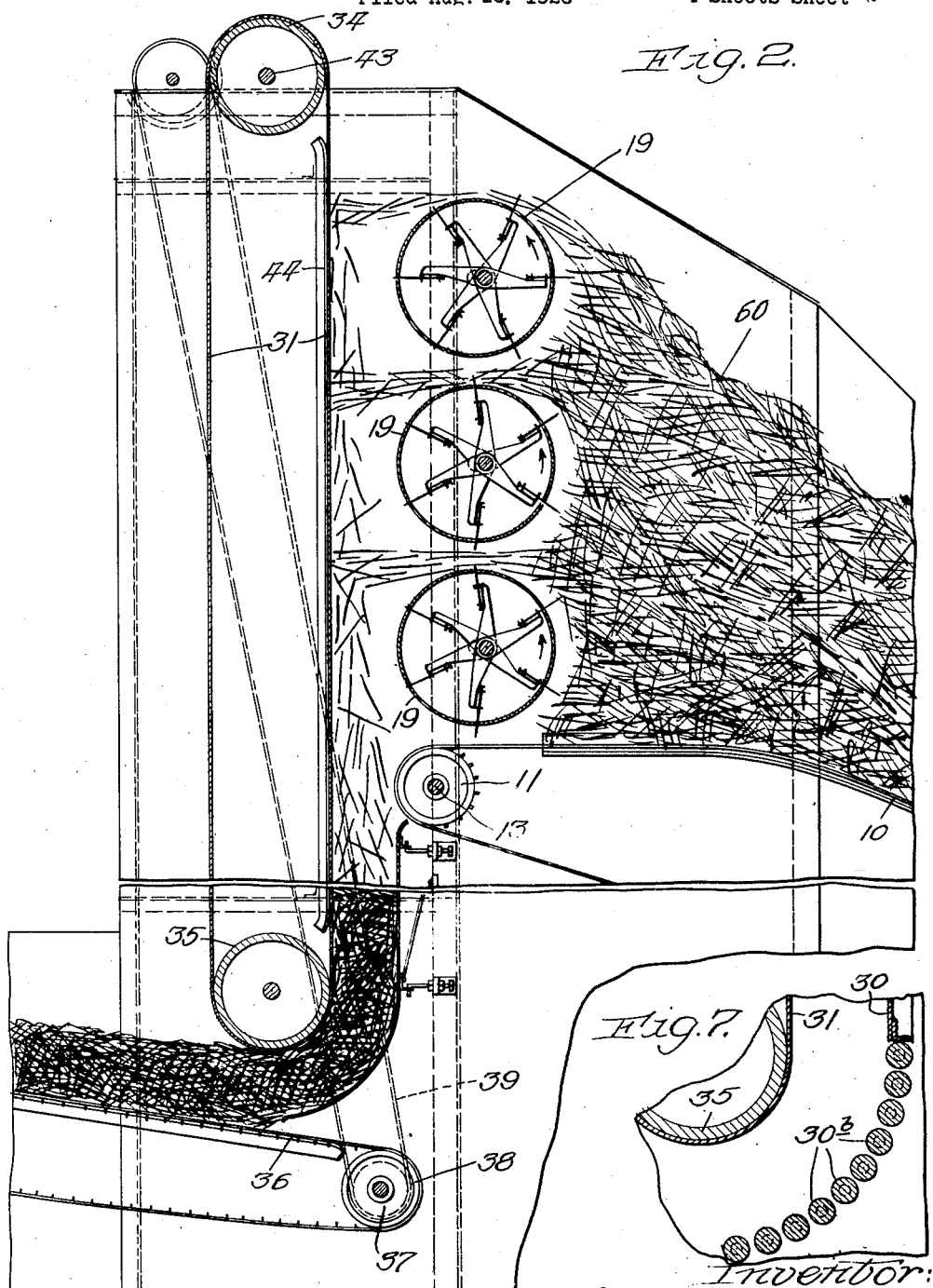

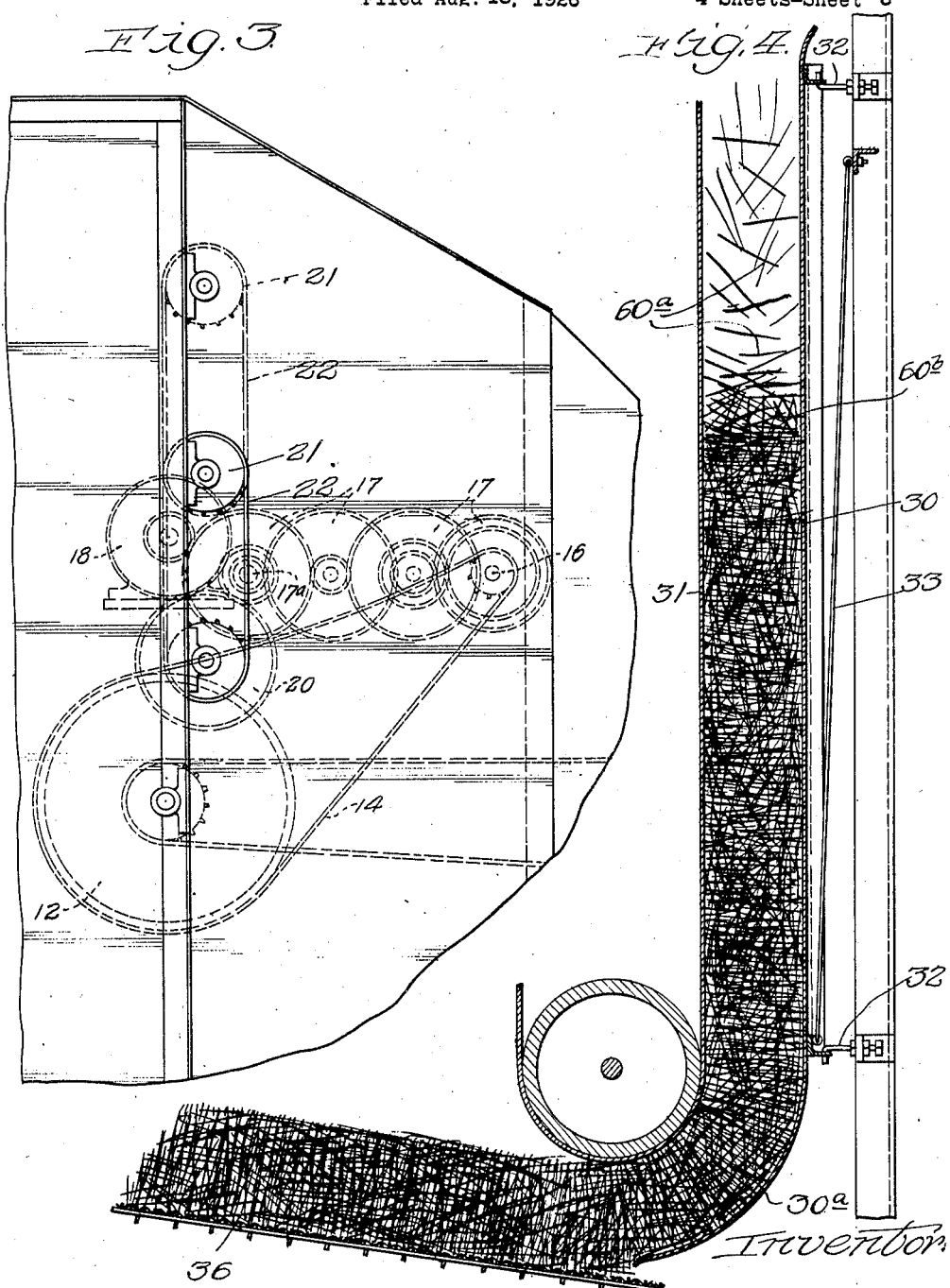

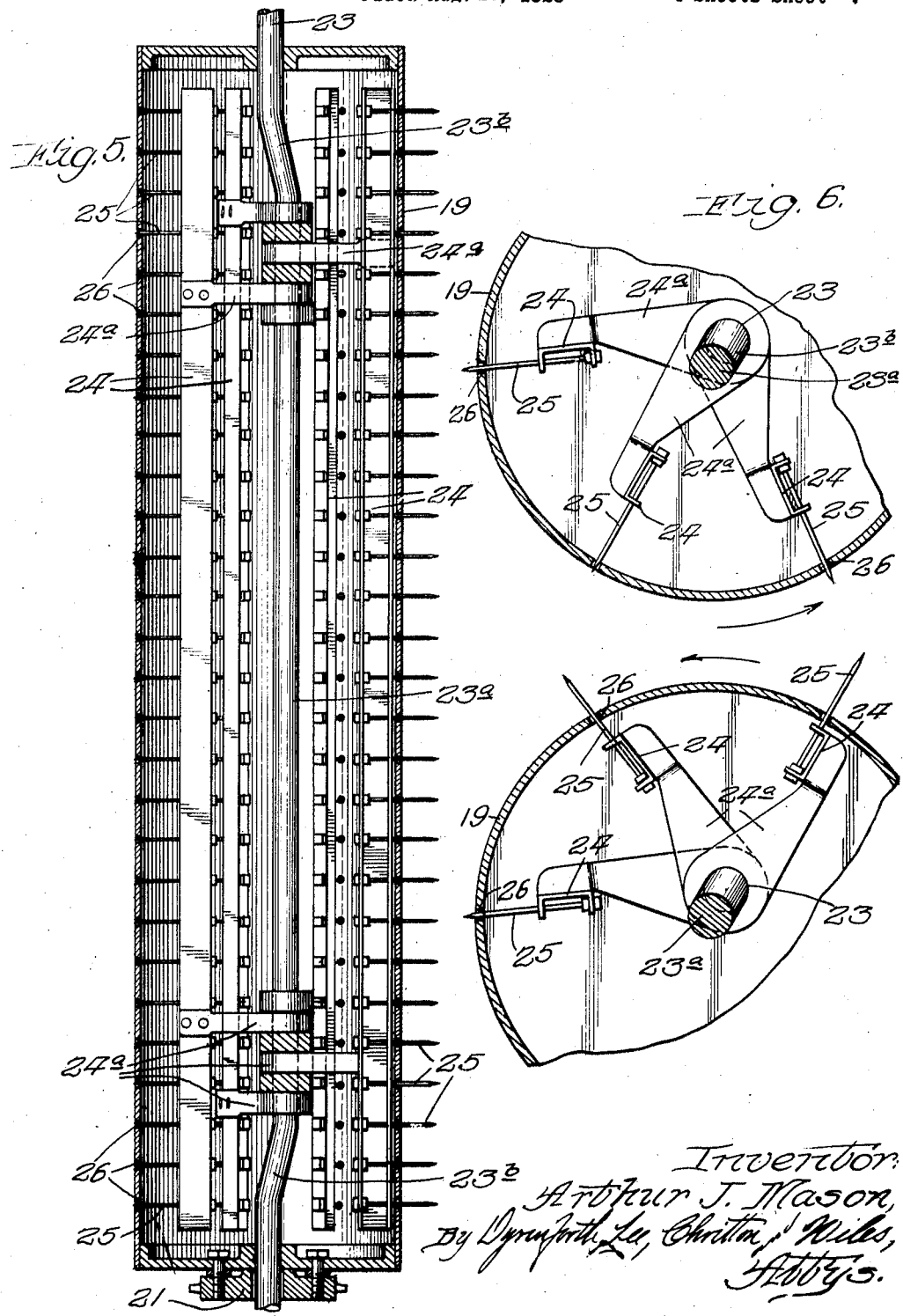

Patented Apr. 24, 1928.

1,667,428

UNITED STATES PATENT OFFICE.

ARTHUR J. MASON, OF HOMEWOOD, ILLINOIS, ASSIGNOR TO MASON ALFALFA PROCESS COMPANY, A CORPORATION OF DELAWARE.

ART OF AGRICULTURE.

Application filed August 18, 1926. Serial No. 129,980.

This invention relates to improvements in the art of agriculture and more especially to apparatus for, and process of curing, drying, or desiccating freshly cut crops.

In my prior Patents Nos. 1,191,980, of July 25, 1916, and 1,264,955, of May 7, 1918, I have disclosed apparatus for and the process of treating freshly cut crops. In such patents, reference is made to the spreading of the material upon a conveyor in a layer of approximately uniform thickness and density before submitting the same to the drying agent. I have found that the spreading of the material by hand is impractical; as it is impossible or too difficult to form a layer or mat in this manner with a thickness and density of sufficient uniformity. If the mat contains portions that are abnormally dense, such portions are likely to be insufficiently dried with the result that centers of fermentation are created with the resulting danger of destruction or spoiling of a quantity of the product. Also, if the mat contains holes or thin portions, the drying gases seek such places with consequent neglect to the other portions and overheating with danger of ignition to the thin places.

One of the features of my invention is the provision of mechanism and apparatus for automatically and continuously forming an endless mat of substantially uniform texture, thickness, density and permeability.

The inventions disclosed herein are particularly useful and adaptable for the drying of leguminous and sod crops, such as, for example, alfalfa and clover. Such crops have a high nitrogen value and are especially valuable as a food for cattle. Such crops, growing as sod also bind the soil to a considerable extent, thus preventing it from being wasted or washed away by cultivation and rains; and this feature increases their value as crops.

In the drying of the material, the product after being formed into a mat is passed slowly through a drying oven resting upon a conveyor. The conveyor is necessarily more or less porous in order to permit free passage therethrough of the drying agent. I have found that by my improved apparatus for and process of making the mat, very little of the material falls through the conveyor when passing through the oven. If the material is placed on the conveyor by hand as, for example, with the use of pitch forks, there is more or less loss of the same through the conveyor unless the meshes thereof be made exceedingly small. The mat made by the use of my invention however, apparently is more or less bound together into a sort of felt-like structure, so that there is very little, if any, loss of material through the conveyor.

Other features and advantages of my invention will appear more fully as I proceed with my specification.

In that form of device embodying the features of my invention shown in the accompanying drawings, Fig. 1 is a top plan view of a mat making machine, Fig. 2 is a view taken as indicated by the line 2 of Fig. 1, Fig. 3 is a diagrammatic view taken as indicated by the line 3 of Fig. 1, Fig. 4 is a vertical sectional view similar to Fig. 2 showing a portion on an enlarged scale, Fig. 5 is a horizontal sectional view through one of the spiked rollers, Fig. 6 is a fragmentary vertical sectional view of the spiked rollers, and Fig. 7 is a view showing a modified form of the lower end of the mattress forming mold.

In the practice of my invention, the crop is preferably cut in short lengths substantially equal to, or shorter than the thickness of the mat to be formed. For example, I have here shown apparatus for forming a mat about ten inches thick; and the crop is preferably cut into lengths of about eight inches. In a separate application, I am showing and claiming an improved mower for harvesting the crop and thus cutting it into short lengths in the field. Such machine, however, forms no part of the present invention and consequently is not shown herein.

The crop, after being cut into short lengths, is delivered by any suitable means to the mat making machine. In another application, I am showing and claiming a field-wagon adapted to be loaded by the mower, carry the material to the mat machine, and there be automatically unloaded onto the receiving conveyor of the latter. This wagon and the unloading mechanism in connection therewith, however, form no part of the present invention and consequently are not shown or described herein.

As shown in the drawings, 10 indicates an inclined receiving conveyor of the mat making machine, onto the lower end of which the crop may be loaded in any suitable manner, as for example, by the unloading mechanism of a filed wagon above referred to. The conveyor 10 comprises an endless belt of any suitable structure passing over the driving roller 11 at the upper end and over a suitable idler roller (not shown) at the lower end. The conveyor 10 is driven in any suitable manner as, for example, by means of the belt-wheel 12 on the shaft 13 carrying the roller 11. The belt-wheel 12 is driven by the belt 14, which in turn is actuated by the belt-wheel 15 on the shaft 16, which is driven through the train of gears 17, 17 by the motor 18.

The material upon reaching the top of the conveyor is brought into engagement with three rapidly rotating spiked rollers indicated by 19, 19. These rollers may be driven in any suitable manner as, for example, by means of the gear-wheel 20 on the shaft of the lower roller which in turn is driven by a pinion on the shaft 17ª. The other two rollers may be driven from the lower end by suitable sprockets and chains 21 and 22 respectively. The parts are so geared and proportioned that the three spiked rollers all rotate in the same direction (as indicated by the arrows in Fig. 2) and preferably at the rate of about 100 rotations per minute.

Since the construction and operation of the three spiked rollers 19, 19 is the same, I will describe in detail but one. As shown in Figs. 5 and 6, the roller 19 is hollow and rotatably mounted upon a shaft 23 having its center portion, as indicated by 23ª, slightly offset or eccentrically arranged by means of the bends 23ᵇ. Rotatably mounted on the center offset portion 23ª of the shaft are six bars 24 arranged substantially 60° apart, each carried by a pair of arms 24ª. Each of the bars 24 carries a series of spikes 25, 25 adapted to project through corresponding holes 26, 26 in the drum or cylinder 19. The spikes are of such a length and the center portion 23ª of the shaft is offset to such an extent, that the ends of the spikes 25 in one extreme position, as shown on the left-hand side of Fig. 5, will be completely withdrawn so that their points are substantially flush with the outer surface of the drum 19; and in the other extreme position, as shown on the right-hand side of Fig. 5, will fully project through the cylinder. It will be seen that rotation of the cylinder 19 on the shaft 23 will therefore cause relative movement between the spikes and the cylinder causing the spikes to move from fully retracted position to the fully extended position and back again to fully retracted position, during each complete rotation of the cylinder. The bends 23ᵇ of the shafts 23 are so positioned that the spikes 25 will be fully retracted when substantially from 90° to 180° from the top in the downward movement of the same. The spikes are retracted to strip the material 60ª therefrom and permit the same to fall into the boot or mold.

Arranged just behind and below the spiked rollers 19 is a vertical boot about eight feet high and of the dimensions of the mat to be formed. For example, this boot may be ten inches thick (for a ten inch mat) and of the desired width. The boot is formed of a stationary front wall 30 and a movable back wall 31. The front wall 30 is preferably supported upon the adjustable arms 32 and the rods 33, the latter taking most of the weight and the former being adjustable forwardly and backwardly as shown in order to vary the thickness of the boot.

The back wall 31 is preferably formed of an endless strip of sheet metal passing over the driving roller 34 at the top and the idler 35 at the bottom. The back wall 31 moves downwardly at substantially the same rate of speed as the movement of the conveyor 36, which receives the completed mat, and consequently the driving roller 34 is preferably driven from the end supporting roller 37 of the conveyor 36. This may be accomplished in any suitable manner as by means of the sprocket 38, chain 39, counter-shaft 40 and gear 41 thereon meshing with the gear 42 on the shaft 43 which carroes the roller 34. Any suitable means, not shown, may be used for driving the conveyor 36. Arranged behind the back wall 31 are a plurality of guide strips 44 in order to prevent backward bulging of the wall 31.

The lower end of the front wall 30 is curved as indicated by 30ª and terminates close to and slightly above the forward end of the conveyor 36, which is adapted to receive the completed mat from the boot. The curved lower end of the front wall 30 instead of being smooth metal as indicated by 30ª, could be made of rollers to lessen the friction as indicated by 30ᵇ in Fig. 7.

In the operation of the device, the crop as indicated by 60 is carried upwardly on the conveyor 10 to the spiked rollers 19, which may be approximately two feet in diameter and arranged a few inches apart. The spikes may be sharpened like the prongs of a pitch fork. The rapidly rotating spiked rollers operate to separate, disintegrate, disentangle and disarrange the crop and brake up any matting or lumping that there might be. The number of rollers operating upon the crop at one time depend upon the rate of feed. At times only the bottom roller or the bottom two will operate. In the event, additional material comes along the crop will pile up and all three of them will come into action. The streams of material, with practically each stalk separate, are thrown against the vertical downwardly moving back wall 31, the material then falling into the boot. In Fig. 4, the disintegrated loose separated stalks and material falling downwardly in the boot are indicated by 60ª, and the upper end of the mat upon which they fall thus forming the mat is indicated by 60ᵇ.

The completed mat 60ᵇ is moved by the conveyor 36 through a drying oven about one hundred and sixty feet long and subjected to a drying agent from a suitable furnace at a temperature of from 275° F. to 300° F. at a pressure of about one inch of water for about thirty-two minutes, the conveyor 36 moving at the rate of about five feet per minute. The construction, operation and detail of the drying oven furnace, conveyor 36, and associated apparatus and mechanism, form no part of the present invention but the same will be shown and claimed by me in other applications.

While I have shown and described certain embodiments of my invention, it is to be understood that it is capable of many modifications. Changes, therefore, in the construction and arrangement may be made without departing from the spirit and scope of the invention as disclosed in the appended claims, in which it is my intention to claim all novelty inherent in my invention as broadly as possible in view of the prior art.

What I claim as new, and desire to secure by Letters Patent, is:

1. In the formation for desiccation of a crop mat of substantially uniform thickness and permeability, the herein described step of loosely depositing the pieces practically individually and promiscuously on a cross sectional surface of the mat.

2. In the formation for desiccation of a crop mat of substantially uniform thickness and permeability, the herein described step of loosely depositing the pieces practically individually and promiscuously on a horizontal cross-sectional surface of the mat.

3. The process of forming a crop mat of substantially uniform thickness and permeability, which comprises the step of loosely depositing the material to compose the mat on a cross sectional surface of the mat so that the mat builds up endlessly.

4. The process of forming a crop mat of substantially uniform thickness and permeability, which consists in cutting the crop into lengths not substantially longer than the thickness of the mat to be formed, and molding the pieces into a mat by loosely depositing the same on a cross sectional surface of the mat being formed.

5. The process of forming a crop mat consisting of first substantially separating the crop pieces and then forming the same into a mat by loosely dropping them on a horizontal cross sectional surface of the mat.

6. The process of forming a crop mat consisting of cutting the crop into pieces not substantially longer than the thickness of the mat, substantially separating said pieces, and loosely dropping them onto a cross sectional surface of the mat being formed.

7. The process of treating crops consisting of cutting the crop while immature, substantially separating the crop pieces, molding the same into a more or less interlocked or interwoven mat of substantially uniform thickness and permeability, and passing a drying agent through said mat.

8. The process of treating crops consisting of cutting the crop while immature, mechanically substantially separating the individual crop pieces and forming the same into a more or less interlocked or interwoven mat of substantially uniform thickness and permeability, and passing a drying agent through said mat.

9. In the formation for desiccation of a crop mat of substantially uniform thickness and permeability, the herein described steps of substantially separating the crop pieces and loosely depositing them onto a cross-sectional surface of the mat so that the mat builds up endlessly.

10. Apparatus of the character described comprising; a tubular mold of substantially uniform cross-dimension substantially the same as the cross-dimension of the mat to be formed; means adjacent one end of said mold for substantially separating crop pieces and depositing them in separated condition in said mold; and means adjacent the other end of said mold for removing therefrom a completed crop mat.

11. Apparatus of the character described comprising; a substantially vertical tubular mold of substantially uniform cross-dimension substantially the same as the cross-dimension of the mat to be formed; means adjacent the upper end of said mold for substantially separating crop pieces and depositing them in separated condition into said mold; and means adjacent the lower end of said mold for removing therefrom a completed crop mat.

12. Apparatus of the character described comprising; a substantially vertical tubular mold having a downwardly moving wall and having a substantially uniform cross-dimension substantially the same as the cross-dimension of the mat to be formed; means adjacent the upper end of said mold for substantially separating crop pieces and depositing them in separated condition in said mold; and means adjacent the lower end of said mold for removing therefrom a completed crop mat.

13. Apparatus of the character described comprising; a substantially vertical tubular mold having a downwardly moving back wall and having a substantially uniform cross-dimension substantially the same as the cross-dimension of the mat to be formed; means adjacent the upper end of said mold for substantially separating crop pieces and depositing them in separated condition in said mold; and means adjacent the lower end of said mold for removing therefrom a completed crop mat.

14. Apparatus of the character described comprising; a tubular mold of substantially uniform cross-dimension substantially the same as the cross-dimension of the mat to be formed; rotatable spiked rollers adjacent one end of said mold for substantially separating crop pieces and depositing them in separated condition in said mold; and means adjacent the other end of said mold for removing therefrom a completed crop mat.

15. Apparatus of the character described comprising; a tubular mold; rotatable spiked rollers adjacent one end of said mold; means in connection with said rollers whereby the spikes thereon are alternately retracted and projected; and means adjacent the other end of said mold for withdrawing therefrom a completed crop mat.

16. Apparatus of the character described comprising; a tubular mold of substantially uniform cross-dimension substantially the same as the cross-dimension of the mat to be formed; means for substantially separating crop pieces; means for depositing them in separated condition in said mold; and means for withdrawing a completed crop mat from said mold.

17. Apparatus of the character described comprising; a substantially vertical tubular mold having one wall thereof downwardly movable; rotating spiked rollers adjacent the upper end of said mold; means in connection with said rollers for alternately retracting and projecting the spikes thereof; means for feeding crop material to said rollers, whereby the crop pieces will be engaged by said spikes, separated, and deposited in said mold; and means for withdrawing a completed crop mat from the lower end of said mold.

18. Apparatus of the character described comprising; a substantially vertical tubular mold having one wall thereof downwardly movable and having a substantially cross-dimension substantially the same as the cross-dimension of the mat to be formed; rotating spiked rollers adjacent the upper end of said mold; means for feeding crop material to said rollers, whereby the crop pieces will be engaged by said spikes, separated, and deposited in spaced condition in said mold; and means for withrawing a completed crop mat from the lower end of said mold.

19. The process of forming a crop mat of substantially uniform thickness and permeability, which consists in cutting the crop into lengths substantially the same length as the thickness of the mat to be formed, and molding the pieces into a more or less interlocked or interwoven mat.

In testimony whereof, I have hereunto set my hand this 5th day of August A. D. 1926.

ARTHUR J. MASON.